June 1, 1937.  A. B. RYPINSKI  2,082,121
SLOW MAGNETIC REGULATING DEVICE
Filed Dec. 27, 1929  4 Sheets-Sheet 1

Parallel winding with windings opposed

Parallel winding with windings opposed

INVENTOR.
Albert B. Rypinski,
BY John C. Brady
ATTORNEY.

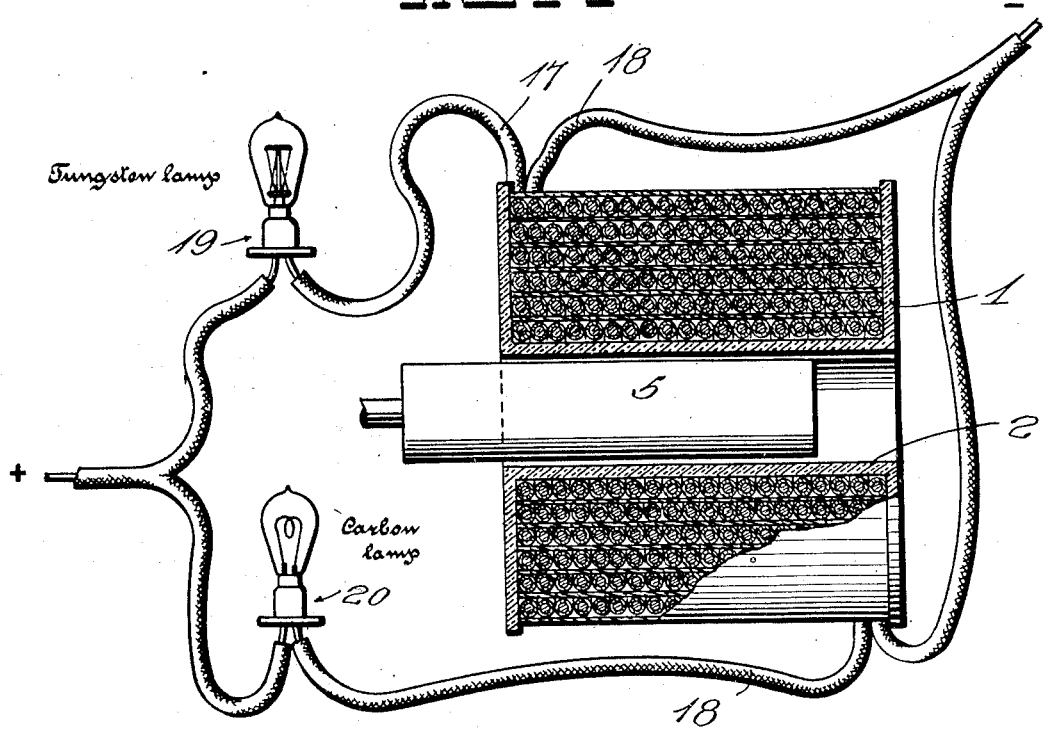
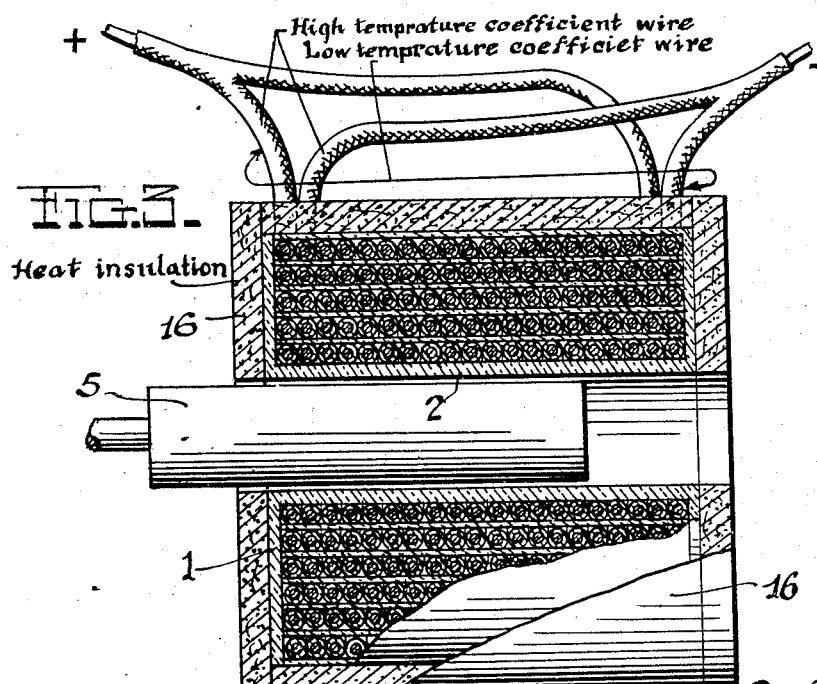

June 1, 1937.  A. B. RYPINSKI  2,082,121
SLOW MAGNETIC REGULATING DEVICE
Filed Dec. 27, 1929  4 Sheets-Sheet 3
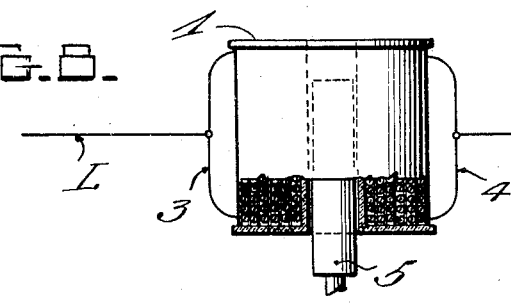
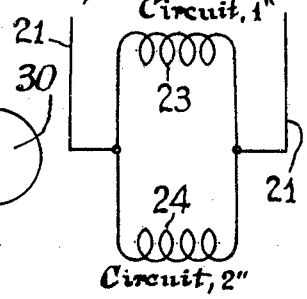
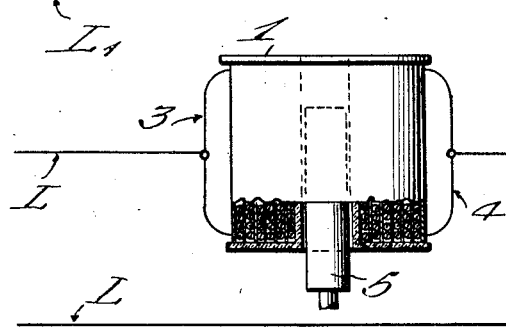
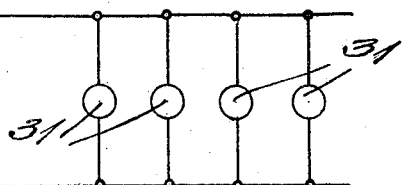
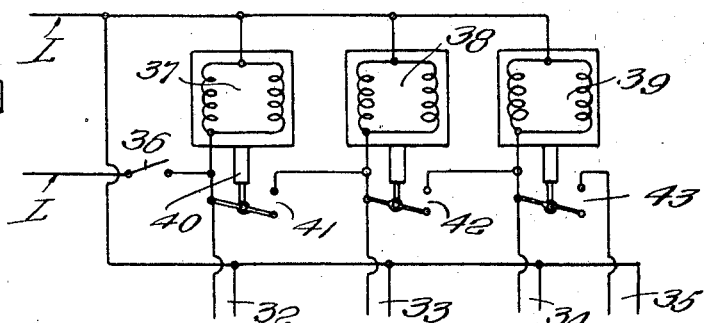
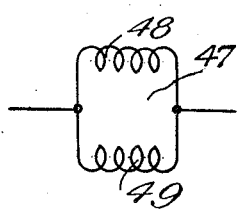
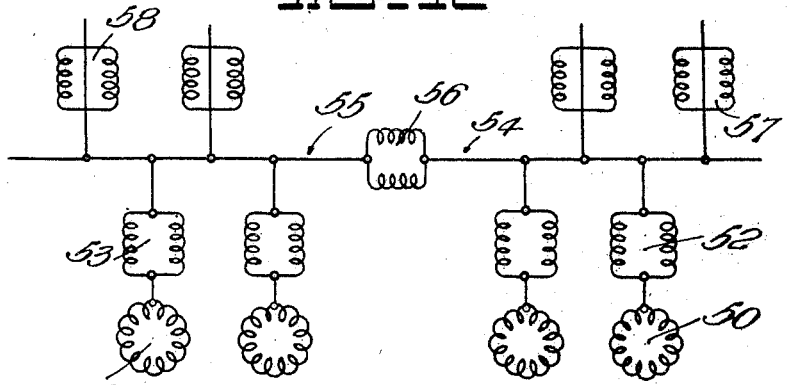
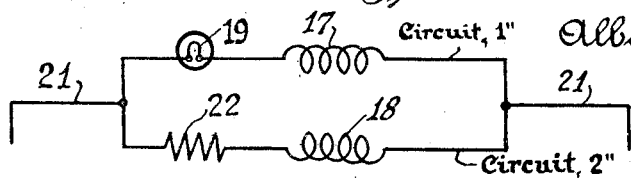
INVENTOR.
Albert B. Rypinski,
BY
John B. Brady
ATTORNEY.

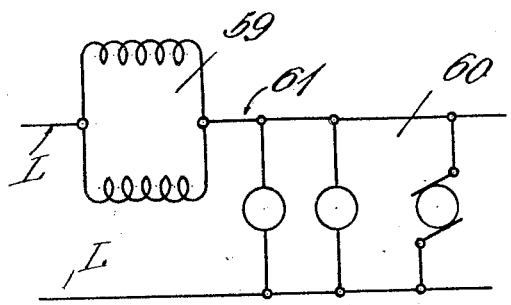
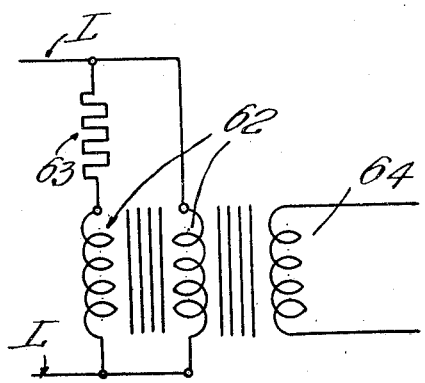
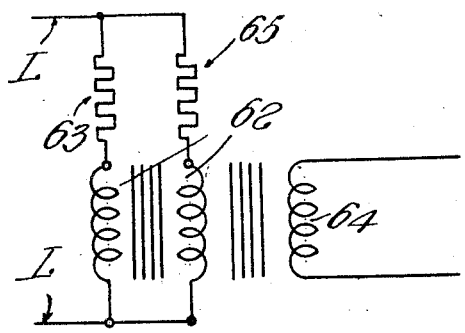
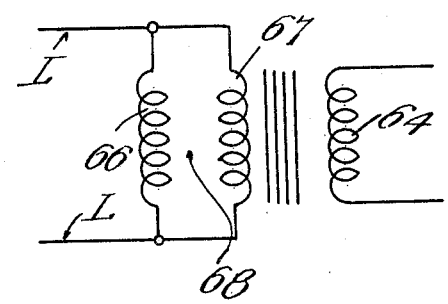
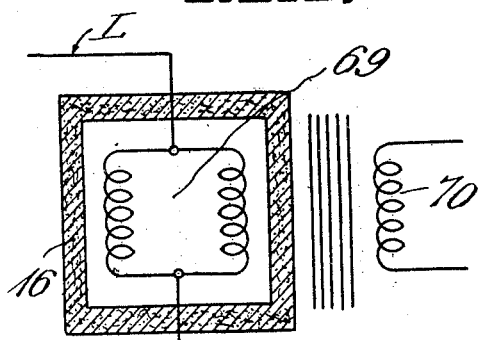
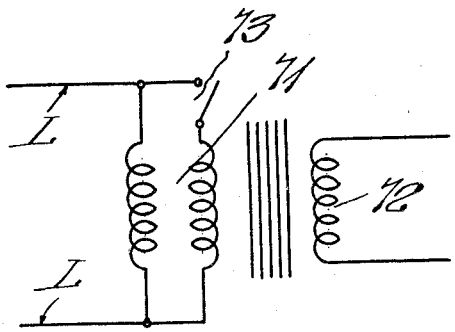
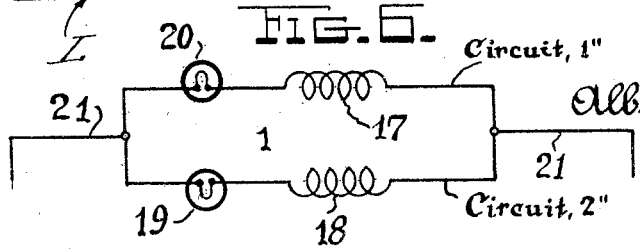

Patented June 1, 1937

2,082,121

UNITED STATES PATENT OFFICE 2,082,121

SLOW MAGNETIC REGULATING DEVICE

Albert B. Rypinski, Laurelton, Long Island, N. Y.

Application December 27, 1929, Serial No. 416,877

43 Claims. (Cl. 171—242)

My invention relates broadly to electromagnet, reactor or transformer and more particularly to a control circuit for an electromagnet, reactor or transformer and to the construction of a time controlled electromagnet, reactor or transformer.

One of the objects of my invention is to provide a circuit arrangement for an electromagnet, reactor or transformer by which the electromagnetic properties of an electromagnet, reactor or transformer may be controlled in accordance with a given time period.

Another object of my invention is to provide a construction of electromagnet, reactor or transformer in which the rise and fall of the magnetic characteristics thereof may be made to conform with a predetermined time period.

A further object of my invention is to provide a construction of electromagnet, reactor or transformer and circuit arrangement therefor wherein a multiple winding is connected in the control circuit for differential operation in controlling the magnetic properties of the electromagnet, reactor or transformer in accordance with a predetermined time cycle.

A still further object of my invention is to provide a plural winding electromagnetic system in which the magnetic effect is controlled by a differential change in resistance in the electromagnetic windings in accordance with a predetermined time cycle.

Still another object of my invention is to provide an electromagnetic system constituted by a multiplicity of windings each having different temperature coefficients of resistance for differentially acting upon said electromagnetic system and predetermining the magnetic properties thereof over a definite time cycle.

Figure 1:
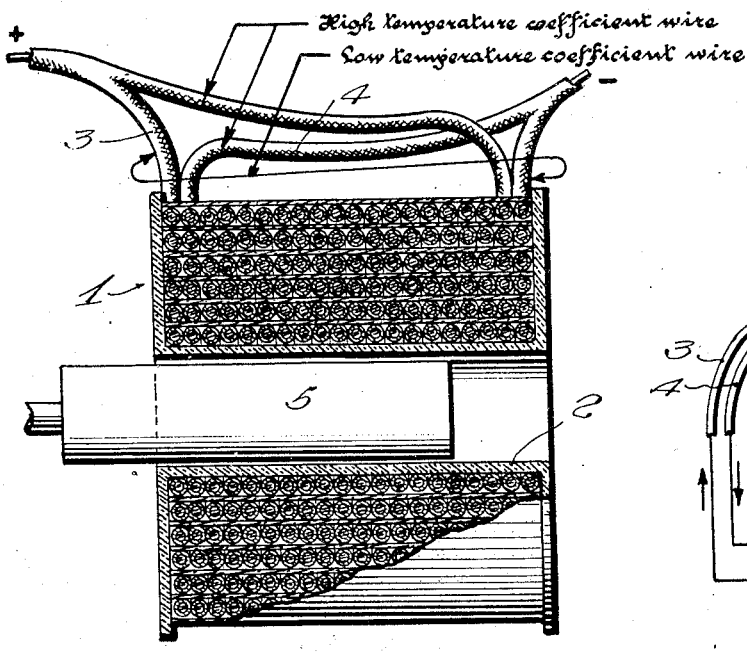
Figure 1A:
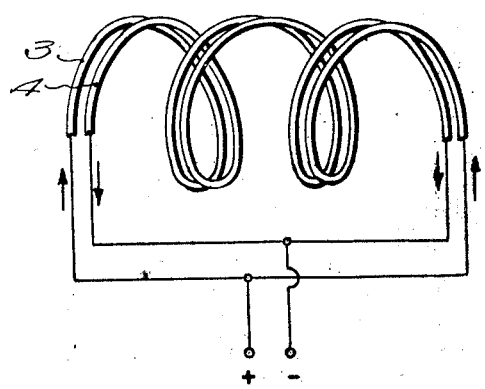
Figure 2:
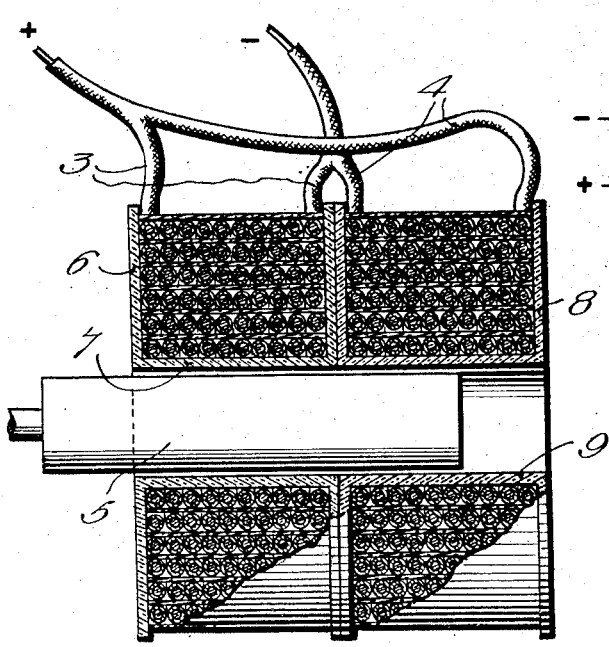
Figure 2A:
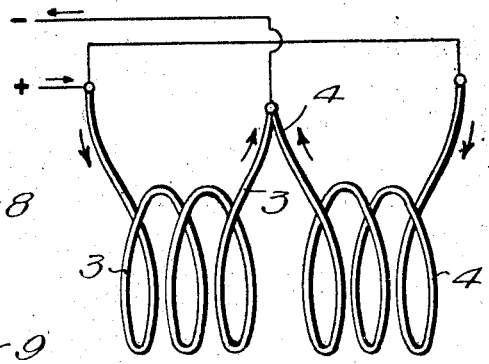

Other and further objects of my invention reside in the construction of electromagnet, reactor or transformer and circuit arrangement therefor as set forth more fully in the specification hereinafter following by reference to the accompanying drawings in which:

Figure 1 is a schematic view showing an electromagnet embodying the principles of my invention; Fig. 1A illustrates the arrangement of windings on the electromagnet; Fig. 2 shows an electromagnet including a modified embodiment of my invention; Fig. 2A shows the winding arrangement for the form of electromagnet shown in Fig. 2; Fig. 3 illustrates a further modified form of electromagnet embodying the principles of my invention wherein the windings on the electromagnet are encased within a heat insulating covering; Fig. 4 is a schematic illustration showing the circuits involved in the operation of an electromagnet embodying the principles of my invention; Fig. 5 is a diagram showing the circuit for the electromagnetic system of my invention; Fig. 6 is a further diagram showing the connections for the electromagnetic system of my invention; Fig. 7 illustrates a type of connection for the several windings in the electromagnetic system of my invention which may be employed in electromagnets, reactors or transformers; Fig. 8 diagrammatically illustrates the application of my invention to motor starters; Fig. 9 shows the application of my invention to sign flashers; Fig. 10 illustrates an application of my invention to time operating sequence devices; Fig. 11 diagrammatically shows the application of my invention to a motor having a field magnet employing the principle of the slow electromagnet of my invention; Fig. 12 diagrammatically illustrates a method of connection for the reactors of the slow magnet type in a power network; Fig. 13 illustrates an application of the slow electromagnet of my invention to a reactor employed as a fuse substitute; Fig. 14 shows the slow electromagnet of my invention applied to a transformer wherein a resistor is inserted in series with one of the two paralleled inductively coupled windings; Fig. 15 shows my invention applied to a transformer wherein resistors are in series with each of the two paralleled inductively coupled windings; Fig. 16 shows my invention as applied in the primary system of the transformer; Fig. 17 shows a transformer embodying my invention wherein the paralleled inductively coupled windings are encased in heat insulation material; and Fig. 18 shows my invention applied to a transformer with a switching device controlling one of the two paralleled inductively coupled windings.

My invention is directed to a circuit arrangement for and construction of an electromagnet in which the magnetic properties of a solenoid or electromagnet may be controlled by the mutual effect of a multiplicity of windings having relatively different temperature coefficients of resistance. In the electromagnet of my invention, the time period over which the electromagnetic properties may build up or become established and thereafter decrease may be controlled. In the electromagnet of my invention, the magnetism may not be established until after the lapse of a predetermined time subsequent to the connection of the electromagnet in the control circuit. The usual electromagnet is instantaneous in its action, that is, the electromagnet attracts a core or armature practically at the time that the current is supplied. Various devices such as dash-pots and bellows are employed to restrain the core or keeper mechanically for a required period of time. In the electromagnet of my invention, it is unnecessary to restrain the core, keeper, or armature by mechanical means. I provide an electromagnetic system and circuit in which two or more windings with different temperature coefficients of resistance are utilized to mutually cooperate upon the same armature. The heating of the windings is utilized to produce a resistance change and correspondingly control the magnetic effect of the windings upon the magnetic system. The windings require an appreciable time to come up to maximum temperature. While heat is generated as soon as the current passes, it does not dissipate as quickly as it is generated and so the temperature builds up in accordance with time. The less heat dissipated the faster the rising temperature. Heat insulation is employed in the electromagnetic system to insure a rapid rise in temperature and a uniform internal condition within the electromagnet. Every slow magnetic device of my invention, as disclosed herein, whether the variable magnetism is used to produce mechanical movement or not, inherently involves changes with time in resistance, inductive reactance, impedance, and power factor of the windings, also changes with time in the electromagnetic induction or transformer effect resulting from the inductive coupling of the windings.

One of the characteristics of the slow electromagnet of my invention when energized from alternating current is the noiseless operation thereof. That is, the usual alternating current electromagnet normally sets up a hum or rattle due to magnetic effects. Since the slow electromagnet normally has no magnetism, the magnet will be quiet. When the windings become mutually effective to produce a magnetic effect at the operating point of the magnet, the duration of any alternating current noise or hum is relatively short as compared with the noiseless periods, as the hum does not commence until the magnet reaches its operating condition.

In the electromagnet system of my invention of the type in which there is normally no magnetism there will normally be no hysteresis or eddy current losses and the only losses are due to the resistance of the windings which will be the IR drop and the I²R losses. The heating of the magnet is low and the power factor normally one hundred percent.

The electromagnet of my invention finds numerous applications, among which I may mention the use of the magnet in relays which open or close only after a predetermined time has elapsed after the current is increased.

In time switches on electric ranges or electric heating devices it is desirable to have the current cut off after a predetermined time has elapsed and this action may be accomplished with the slow electromagnet of my invention which may be constructed to lose its magnetism after a predetermined time following the supply of current to the electromagnet circuit.

Motor starters are often controlled by using a dash-pot or other mechanical means to introduce the element of time in the starting of motors. The timed electromagnet of my invention may be used in association with such dash-pot or other mechanical means. The timed electromagnet of my invention renders such dash-pot or other mechanical means unnecessary. Any class of slow magnetic device within the scope of this disclosure may be applied in any way to replace the usual resistance, reactor or transformer type motor starters, in which dash-pots or other mechanical timing devices are employed.

In electrical sequence devices it is often necessary to control a mechanism through a given order of progression, and the slow electromagnet of my invention is particularly suitable for such use as the magnetic condition thereof may become effective after a predetermined lapse of time subsequent to the supply of current to the magnet circuit. The magnet circuit may then be broken and can only reclose after the magnet windings have cooled to a predetermined temperature. The slow electromagnet of my invention is particularly adapted for sign flashers eliminating the driving motor and reduction gear employed in sign flasher mechanism.

Motor or generator field magnets may employ the principle of the slow electromagnet in accordance with my invention and thus give speed, torque, or voltage characteristics varying with temperature in the windings. Starting equipment may be considerably simplified by use of the slow electromagnet of my invention as the winding of a slow electromagnet may assist the main winding in starting, that is, the flux from the slow electromagnet may be in the same direction as that from the main windings, and the total flux at the start would be increased and the motor would draw a smaller starting current than if the extra winding were not present. On alternating current motors the rotor turns due to a "rotating field" set up by the polyphase line current. If this field could be slowed down it would result in a slow speed motor, say 60 R. P. M. Such a motor running at one revolution per second is suitable for operating clocks without reduction gearing and slow moving devices like windshield wipers.

Assume a single phase motor wound with three differential thermal field windings placed as a polyphase winding is placed in an induction motor. If the rotor carried the means of making and breaking the circuit to the stator windings, the field set up by one set of coils could be made to increase relatively slowly up to a maximum, be cut off and the next set switched on, come slowly up, be switched off and the third set come slowly up by which time the first set would be cooled off sufficiently to start the cycle over again. This will result in a rough equivalent of the rotating field of a polyphase motor and the rotor would follow slowly around.

On alternating current motors differential thermal windings may be used either as main or auxiliary windings to increase the magnetic resistance of the motor under starting conditions.

In transformer constructions where it is desired to provide a transformer whose secondary voltage increases or decreases with time, the two primary windings are arranged to buck and be affected by temperature. If the bucking effect is equal when the windings are cold, the secondary voltage will increase with time. If the bucking effect is equal when the windings are at elevated temperature, the secondary voltage will decrease with time.

In reactance coils of the air or iron core types which are used to limit short circuit currents in a power system, the coils must be sufficiently sturdy to meet short circuit strains. These reactances carry from twenty to thirty-three times full load current under conditions of short circuit, and unless a large amount of iron is used the coils will be saturated long before these maximum values are reached. I may employ a set of opposed equal windings according to my invention herein in a power circuit and there will be no magnetic field at full load. Under short circuit conditions, however, heating will rapidly occur and the unbalance will set up a flux which may saturate a suitable core, the reactor being much more compact, stronger, and having less losses than reactors heretofore employed.

The slow electromagnet of my invention is particularly useful in the control of traffic signals or traffic lights normally changed at regular intervals. The timed electromagnets of my invention automatically control the operation of signal circuits in a traffic system.

In electric clocks, the slow electromagnet of my invention is particularly useful in that the point of operation of the magnet depends upon the lapse of time and the rise in temperature in the windings of the magnet which effect may be usefully employed in the operation of a time mechanism.

My invention will be more fully understood by more detail reference to the accompanying drawings where I have shown in Fig. 1 an electromagnet wound on spool member 1 having the tubular core portion 2 which receives the two wires 3 and 4 in the form of a twin conductor. The windings 3 and 4 each have different temperature coefficients of resistance. The two windings are connected in parallel and opposed, and are designed to balance by producing zero or nearly zero magnetism at predetermined temperature. As soon as the temperature rises by the current passing through the windings it affects the two windings unequally, that is, it produces a change in resistance in winding 3 and a different change in resistance in winding 4. Since the line voltage is the same upon both windings, the windings will now be unbalanced magnetically and the core, or keeper, or armature indicated generally at 5 will be attracted. This result follows slowly and to a greater and greater extent as the unbalance continues. The electromagnetic system may be composed of two separate supporting spools as indicated in Fig. 2, that is, a supporting spool indicated by reference character 6 having tubular member 7 therein and the supporting spool 8 having tubular member 9 therein. The winding 3 is disposed entirely upon spool 6 and tubular member 7. The winding 4 is carried entirely upon spool 8 and tubular member 9. The windings are opposed and act magnetically one upon the other in the manner described with respect to the windings which are wound in twin formation.

In order that the temperature conditions within the electromagnet may be dependent upon the inherent characteristics of the magnet and to avoid inaccuracies which may arise from external sources of heat, I provide a heat insulating casing 16 for the electromagnetic system, as shown in Fig. 3. The spool 1 having tubular portion 2 thereon supports the windings 3 and 4 within the heat insulating casing 16 and heat generated within the electromagnet is thereby employed for controlling the operating characteristics of the electromagnet. External temperatures are thus shielded from the electromagnet system.

Instead of employing conductors, each of which possesses different temperature coefficients of resistance, I may connect the windings of the electromagnetic system in separate electrical circuits including independent resistances of selected values. In Fig. 4 the conductors 17 and 18 are wound side by side on spool 1 and tubular support 2 and are separately connected in circuit with different resistance devices. The effect of unbalanced magnetic properties may be obtained after the current has been flowing long enough to heat the resistance devices which is similar to the effect obtained when windings of different temperature coefficients of resistance are employed. The windings 17 and 18 are equal and opposite but in series with winding 17 there is inserted a resistance device 19 which has a high positive temperature coefficient of resistance and in series with winding 18 there is inserted a resistance device 20 which has a nearly zero or negative coefficient of resistance. For purposes of illustrating the principles of my invention I have shown in Fig. 4 a carbon incandescent lamp 20 in circuit with winding 18 where the carbon lamp has a negative temperature coefficient of resistance and in circuit with winding 17 there is shown a tungsten lamp 19 which has a positive temperature coefficient of resistance. When current passes, the filaments heat and one circuit increases in resistance while the other decreases. This effect is increased in a circuit where this combination is in series with the line 21. Here the total current is nearly a constant and the relative resistance of the two paths determine how much each will carry. When cold the current will be equal in the two branches. As soon as the filaments heat, the carbon lamp circuit will take more of the current than the other which will unbalance the magnetic effect of the coils and produce a resultant pull on the core of keeper. The resultant magnetism may be decreased with time instead of increased as in the previous illustrations. This may be done by so proportioning the paths that the magnetic effect will be zero when hot and unbalanced, and therefore high, when cold. The electromagnet of Fig. 4 may be replaced by a reactor or one winding of a transformer and the result will be an increase or decrease in the magnetic effect of the windings and a corresponding change in the current, voltage or power factor of the reactor or transformer.

In Fig. 5 I have shown a circuit embodying the principles of my invention in which the electromagnetic windings 17 and 18 are shown in opposed relation and each respectively connected in series with the tungsten lamp 19 and with resistance device 22 in the line circuit 21. For example assume the voltage applied across line 21 to be 100 volts. There are two paths provided for the current flow, that is circuit No. 1 including winding 17 and tungsten lamp 19, and circuit No. 2 including winding 18 and resistance device 22. The tungsten lamp 19 may have a resistance when cold of 40 ohms and the resistance of winding 17 when cold may be 10 ohms. Similarly circuit No. 2 is balanced as resistance device may have a value of 40 ohms and winding 18 may be 10 ohms. The result is a condition of zero magnetism. The current in circuit No. 1, when the series connected elements therein are cold, will be:

$$I_1 = \frac{E}{R} = \frac{100}{50} = 2 \text{ amperes}$$

The current in circuit No. 2, when the series connected element therein are cold, will be:

$$I_2 = \frac{E}{R} = \frac{100}{50} = 2 \text{ amperes}$$

In which, $I_1$ represents the current in circuit No. 1; $I_2$ is the current in circuit No. 2; E is the impressed voltage; and R is the total resistance of the series circuit.

A tungsten lamp increases its resistance about ten times when passing from room temperature to operating temperature. Therefore when the tungsten lamp 19 becomes hot it may be assumed that the resistance thereof will be 400 ohms. Under these conditions the current in circuit No. 1 becomes $$I_1 = \frac{100}{410} = .244 \text{ ampere}$$

However the current in circuit No. 2 remains the same as the original value, that is 2 amperes as shown in the following equation:

$$I_2 = \frac{100}{50} = 2 \text{ amperes}$$

In Fig. 5 the device 22 which has 40 ohms resistance is of zero temperature coefficient material and any change in the coil windings will be balanced off one against the other so the currents in the two windings which when cold were equal at 2 amperes, become .244 for one and 2 for the other. The magnetic effect of the 2 ampere winding will be nearly nine times as much as the .244 ampere winding and the coil will be strongly magnetized. The time element here is the heating time of the tungsten filament. When a carbon lamp is substituted in the circuit of Fig. 5 for the tungsten lamp 19 as shown in Fig. 6 where the carbon lamp has a negative temperature coefficient of resistance, the current distribution in circuit No. 1 and circuit No. 2 will be the same when cold as was the original current distribution when using a tungsten lamp, assuming that the carbon lamp has 40 ohms resistance which is the same as the resistance of the tungsten lamp.

The current distribution when the elements in both circuits No. 1 and No. 2 are cold will therefore be:

$$I_1 = \frac{100}{50} = 2 \text{ amperes}$$

$$I_2 = \frac{100}{50} = 2 \text{ amperes}$$

The result of this relationship is substantially zero magnetism.

Upon increase in temperature to operating temperature, a carbon lamp reduces its resistance about one-half. Therefore, assuming that the carbon lamp inserted at the position 19 in the circuit of Fig. 6 is heated to operating temperature the current distribution in the circuits Nos. 1 and 2 becomes:

$$I_1 = \frac{100}{30} = 3\frac{1}{3} \text{ amperes}$$

$$I_2 = \frac{100}{50} = 2 \text{ amperes}$$

As a result the magnetic condition of the coil is unbalanced and magnetism appears. The condition with the carbon lamp in the circuit differs from the condition with the tungsten lamp in the circuit in that when the circuit No. 1 employs the carbon lamp, circuit No. 1 overbalances the circuit No. 2, whereas circuit No. 1 using the tungsten lamp is overbalanced by circuit No. 2. The time element involved is the heating time of the carbon filament lamp. This time is greater than the time required to heat the tungsten lamp because the rush of current at the start heats the tungsten filament rapidly, whereas the carbon lamp starts with low current and builds up.

In Fig. 6 I have illustrated the insertion of the carbon lamp 20 in circuit No. 1 and the tungsten lamp 19 in circuit No. 2, whereupon the unbalanced effect is increased. Considering the carbon and tungsten lamps to each have 40 ohms resistance when cold, and the windings 17 and 18 to each have 10 ohms resistance, the current in the circuits Nos. 1 and 2 is as follows:

$$I_1 = \frac{100}{50} = 2 \text{ amperes}$$

$$I_2 = \frac{100}{50} = 2 \text{ amperes}$$

This results in zero magnetism.

Assuming the carbon lamp 20 to reduce in resistance to 20 ohms and the tungsten lamp 19 to increase in resistance to 400 ohms under operating conditions when hot, the current distribution in circuits Nos. 1 and 2 becomes:

$$I_1 = \frac{100}{30} = 3\frac{1}{3} \text{ amperes}$$

$$I_2 = \frac{100}{410} = .244 \text{ ampere}$$

Circuit No. 1 has now over 13½ times as much current as circuit No. 2 and the resultant magnetic effect is correspondingly great. The time here is a rapid increase while the tungsten is heating and a slower further increase while the carbon lamp comes up to temperature. The arrangements described in connection with Figs. 5 and 6, wherein resistors having different temperature coefficients of resistance are inserted in series with each of the windings to alter the current distribution in the windings with temperature changes in the resistors, may be utilized in connection with slow electromagnets, slow reactors, slow transformers or any combination of these devices in connection with any of the several appliances and systems disclosed in the several parts of this application.

In Fig. 8, I have illustrated diagrammatically opposed windings 23 and 24 having different temperature coefficients of resistance where the windings are connected in parallel and directly connected across the power supply circuit 21. Again assuming 100 volts impressed across the power supply circuit 21, and assuming that each winding 23 and 24 has 50 ohms resistance when cold, the current divides in circuits Nos. 1 and 2 indicated in Fig. 8 as follows:

$$I_1 = 2 \text{ amperes}$$

$$I_2 = 2 \text{ amperes}$$

The result of this distribution is zero magnetism.

If winding 23 is a relatively light copper wire with a temperature coefficient of .00388 ohm per degree at 20° C. and winding 24 has the same number of turns but of heavier wire with a temperature coefficient of .0004 or less it is apparent that the two windings could have identical resistance when cold but be considerably different when hot. As the temperature rises a set of conditions may be assumed where the resistance of winding 23 in circuit No. 1 rises from 50 ohms to 55 ohms and the winding 24 in circuit No. 2 rises from 50 ohms to 75 ohms. Under these conditions the current in the separate circuits is as follows:

$$I_1 = \frac{100}{55} = 1.82 \text{ amperes}$$

$$I_2 = \frac{100}{75} = 1.33 \text{ amperes}$$

The unbalance of about one-half ampere would set up a magnetic effect. The time element here is the time required for the windings to heat up which may be controlled by suitable design.

Where it is desired to reduce the magnetic pull of a solenoid or electromagnet, or to make the magnetic pull disappear with time, the circuits may be designed so that the circuits in cold condition start with unequal opposed windings and automatically have their relative temperature coefficients of resistance adjusted so that they will become more nearly equal or exactly equal for neutralizing the magnetic field thereof after the lapse of a predetermined time period.

For example, in Fig. 7 if winding 23 in circuit No. 1 has a normal value of 50 ohms and winding 24 in circuit No. 2 has a normal value of 75 ohms, the currents in the separate circuits when the elements are cold will be as follows:

$$I_1 = \frac{100}{50} = 2 \text{ amperes}$$

$$I_2 = \frac{100}{80} = 1.33 \text{ amperes}$$

This unbalanced condition sets up a magnetic field. As the coils heat the resistances gradually equalize, that is winding 23 in circuit No. 1 may assume a resistance value of 80 ohms and winding 24 in circuit No. 2 may assume a value of 80 ohms giving a current flow in the separate branches as follows:

$$I_1 = \frac{100}{80} = 1.25 \text{ amperes}$$

$$I_2 = \frac{100}{80} = 1.25 \text{ amperes}$$

The magnetism now disappears and the electromagnet will drop its core, keeper or armature, as the case may be.

Reactors and transformers may be arranged to have their magnetism disappear as the opposed windings equalize magnetically in the same way as the electromagnet just described.

It will be apparent from the foregoing that an electromagnetic system may be designed to start with zero magnetism and increase, to start with magnetism and decrease to zero, or if the magnetic elements balance at some intermediate point, to start with magnetism, decrease to zero, and rise again. If on direct current, the polarity of the later condition will be the reverse of the starting condition. If on alternating current, the instantaneous polarity at the final condition will be the reverse of that at the start, that is, the polarity at the initial condition with the current flowing in one direction will be the opposite to that at the final condition with the current flowing in the same direction. These effects may be utilized in connection with any device or system within the scope of the disclosure.

Fig. 8 diagrammatically shows the application of my invention to motor starters in which the supply line L—L1 carries current to the motor 30 through the slow electromagnet constituted by windings 3 and 4 wound on spool member 1 and operating upon armature 5. The motor starts after a predetermined time period depending upon the characteristics of the slow electromagnet and receives the full line voltage gradually as the motor acquires full speed.

As shown in Fig. 9, my invention is applicable to sign flashers by connecting the slow electromagnet windings 3 and 4 in series with the supply line L leading to the lamps 31. The lamps 31 have their voltage and current controlled according to the characteristics of the slow electromagnet constituted by windings 3 and 4.

Fig. 10 shows a diagram illustrating a sequence device. The supply comes in at LL. Circuits 32—33—34—35 are to be energized and left connected one after the other, with a time interval between each one. Switch 36 energizes slow magnet 37 and also circuit 32. Coil 37 lifts its core 40 after it has heated a predetermined amount. Contact 41 closes when this occurs, energizing slow magnet coil 38 and circuit 33. After a time, coil 38 closes contact 42, energizing coil 39 and circuit 34. After another period of time, coil 39 closes contact 43 energizing circuit 35. The time elements of coils 37, 38 and 39 may all be different or the same depending on their design and the factors affecting their heating in use. Opening switch 36 cuts off the supply to the whole combination. After the coils have cooled sufficiently, the operation may be repeated.

Fig. 11 illustrates the manner in which a motor or generator field magnet may employ the principle of the slow electromagnet in accordance with my invention and thus give speed, torque, or voltage characteristics varying with temperature in the windings. The slow electromagnet is represented at 47 comprising the paralleled inductively coupled windings 48 and 49 employed in the field magnet of the motor or generator.

Fig. 12 gives a one line connection diagram of reactors of the slow magnet type in a power network. Generators 50 and 51 feed through reactors 52 and 53 into two busses 54 and 55 respectively. A bus tie reactor 56 connects the groups. Feeder reactors 57 and 58 protect the individual feeders. It is obvious that any of these reactors may be the instantaneous type and the balance, the slow type. It might be desirable to have the feeder reactors 57 and 58 instantaneous and the other slow, or to have both slow and instantaneous reactors in the bus or generator leads.

Fig. 13 shows a slow magnet 59 in series with a branch circuit supplying motors and lights 60 from source L. Assume the full load capacity of the circuit to be 15 amperes. Coil 59 would be designed to remain comparatively cool and almost balanced for all currents of 15 amperes or less. Above 15 amperes, heat would begin to build up in the coil faster than it is dissipated. As the temperature rises in the coil, it begins to unbalance inductively and produce an inductive drop. This, in turn, reduces the voltage across the load 60 and limits or lowers the current. A short circuit across the lines at 61 would produce a very heavy current flow for a short time and greatly accelerate the heating, resulting in a very fast choking action. In this way, a coil will result which will not permit the current to exceed a predetermined maximum except for the time required for it to come up to temperature. It will thus be safe to leave the current on the line even with a fault or short circuit connected, as it will be within the safe carrying capacity of the wires.

Fig. 14 shows the slow electromagnet of my invention applied to a transformer having a primary system constituted by the paralleled disposed slow electromagnetic windings 62. A resistor 63 is connected in series with one of the paralleled inductively coupled windings, the line circuit L is connected to the slow electromagnetic system, as shown. A secondary winding 64 is magnetically coupled with the slow electromagnetic system.

Fig. 15 illustrates my invention applied to a transformer in which, in addition to the resistor 63 in series with one of the paralleled connected slow electromagnetic primary windings 62, there is another resistor 65 in series with the other primary winding of the slow electromagnetic system. That is, there is a resistor in series with each of the two paralleled inductively coupled windings.

Fig. 16 shows a manner of applying my invention to the primary system of a transformer having different coefficient materials in the windings. That is to say, the windings 66 and 67 constituting the primary system 68 of the slow transformer illustrated in Fig. 16 are formed from different coefficient materials and are magnetically coupled with secondary winding 64.

As shown in Fig. 17, I may apply a heat insulation casing 16 to the primary system constituted by the slow electromagnetic windings 69 in a manner similar to the heat insulation which I have disclosed in Fig. 3. The line circuit L connects with the slow electromagnetic windings 69 which are encased in the heat insulation material 16. A secondary winding 70 is magnetically coupled with the windings constituting the slow electromagnetic primary system 69.

Fig. 18 illustrates the manner in which the slow electromagnetic windings constituting the primary system of a transformer may be connected in order to change the transformer from a slow electromagnetic characteristic to an instantaneous characteristic. The primary system which connects to line circuit L comprises a pair of magnetically opposed slow electromagnetic windings 71 coupled to the secondary winding 72. A switch 73 is provided in series with one of the two primary windings constituting the system 71 so that one primary winding may be cut out of the circuit, thereby restoring the transformer to a transformer of instantaneous character. Other switching arrangements may be employed in the transformer of my invention.

Attention is invited to the following patents and copending applications which disclose and claim subject matter related to this application:

S. N. 608,095—filed April 28, 1932, for Circuit controller, now Patent No. 1,972,112, dated September 4, 1934.

S. N. 671,767—filed May 18, 1933, for Slow electromagnets having the same or similar temperature coefficients of resistance materials in differential windings.

S. N. 671,768—filed May 18, 1933, for Conductors for slow electromagnets and reactors, now Patent No. 1,972,319, dated September 4, 1934.

S. N. 699,616—filed November 24, 1933, for Motor starting systems.

S. N. 699,617—filed November 24, 1933, for Signaling systems.

S. N. 699,618—filed November 24, 1933, for motor control system.

S. N. 699,619—filed November 24, 1933, for Distribution systems.

S. N. 699,620—filed November 24, 1933, for Arc welding apparatus.

S. N. 703,313—filed December 20, 1933, for Electromagnetic device.

S. N. 705,466—filed January 5, 1934, for Slow electromagnetic devices having different temperature coefficient of resistance materials in assistant windings.

The windings in the electromagnetic system of my invention may be arranged in a variety of different ways to facilitate the temperature reaction of one winding upon the other for securing the desired relationship of resistance in the separate circuits of the electromagnet. Various mechanical means may be employed for mounting the windings in desired relationships and while I have described my invention in a number of its preferred embodiments I desire that it be understood that modifications may be made and that no limitations upon my invention are intended other than are imposed by the scope of the appended claims.

What I claim as new and desire to secure by Letters Patent of the United States is as follows:

1. In a control system, a pair of energizing windings positioned in opposed magnetic relation, a load circuit connected in series with and in non-magnetic relation to said windings, said windings being formed of materials having different temperature coefficients of resistance and subject to changes in temperature for producing disproportionate changes in the resistances and therefore in the currents in said windings, said windings being initially balanced to operate at unity power factor at one value of current and temperature, and at less than unity power factor at other values of current and temperature, and when operating at less than unity power factor to introduce an inductive voltage drop in the circuit to control the current flow therein.

2. In an impedance device for controlling the current from a supply circuit to a load, a pair of windings magnetically coupled in opposition one to the other, connected in parallel and disposed in series with and magnetically independent of said load circuit, the resistance of one of said windings varying more than the resistance of the other with temperature changes to alter the ratio of the currents in the parallel paths and vary the resultant magnetism in the impedance device for changing its inductive reactance and thereby controlling the current passing to the load.

3. In a reactor for controlling the current from a supply circuit to a load, a pair of windings magnetically coupled in opposition one to the other and connected in parallel and disposed in series with and magnetically independent of said load circuit, means for altering the ratio of the currents in the parallel paths with temperature changes for varying the resultant magnetism in the reactor for changing the power factor of the circuit.

4. An impedance device comprising a pair of magnetically coupled and opposed windings disposed in parallel one with respect to the other, said windings being formed of metals having different temperature coefficients of resistance, means for causing one winding to rise in temperature more than the other, thereby causing a change in the magnetism and inductive reactance of the reactor, a power supply circuit, a load circuit, connections for connecting said load circuit to said power supply circuit through said windings for controlling the current supplied to said load circuit, said windings and said load circuit arranged to be magnetically independent of each other.

5. An article of manufacture comprising a reactor made up of a core, two magnetically coupled and opposed windings on the core, said windings connected in parallel of high temperature coefficient material having different temperature coefficients of resistance, heat insulation between the high temperature coil and the other coil and core, means for causing one coil to operate at relatively high temperature while the other coil and the core operate at lower temperatures.

6. A reactor comprising a pair of magnetically coupled and opposed windings connected in parallel one with respect to the other, means for causing one winding to carry variably more current than the other thereby causing changes in the magnetism and inductive reactance of said reactor, a power supply circuit, a load circuit, means for connecting said load circuit to said power supply circuit through said windings, with no magnetic coupling between said load and said windings, for controlling the current supplied to said load circuit.

7. A reactor comprising a pair of magnetically coupled and opposed windings disposed in parallel one with respect to the other, said windings being formed of dissimilar materials, means for causing one winding to rise to a higher temperature than the other, thereby causing a change in the magnetism and inductive reactance of the reactor, a power supply circuit, a load circuit, connections for connecting said load circuit to said power supply circuit through said windings, with no magnetic coupling between said load and said windings, for controlling the current supplied to said load circuit.

8. A reactor comprising a pair of magnetically coupled and opposed windings disposed in parallel one with respect to the other, said windings of metals having different temperature coefficients of resistance, means for causing one winding to rise in temperature more than the other, thereby changing the magnetism and inductive reactance of the reactor, a power supply circuit, a load circuit, connections for connecting said load circuit to said power supply circuit through said windings, with no magnetic coupling between said load and said windings, for controlling the current supplied to said load circuit.

9. In an impedance device whose inductive reactance changes over a period of time at a specified current and wherein said device comprises two windings connected in parallel paths, the conductors of which consist of metals having substantially different temperature coefficients of resistance, the method which comprises opposing the magnetic effects of the two windings one upon the other, and causing one winding to increase in resistance more than the other for altering the ratio of the currents in the parallel paths.

10. In a power circuit, a power source, a load, and a current limiting device in series with and magnetically independent of said load comprising a pair of windings magnetically coupled in opposition and connected in parallel, said windings having different temperature coefficients of resistance, said windings being magnetically balanced for all currents below a predetermined limit and being subject to rise in temperature for currents above said predetermined limit for effecting a magnetic unbalance and producing an inductive voltage drop for correspondingly reducing the voltage across the load and limiting the current thereto.

11. As an article of manufacture, an impedance device comprising a core of magnetic material, two windings connected in parallel, inductively coupled and opposed and arranged on said core for producing a minimum of leakage flux, said windings formed of materials having substantially different temperature coefficients of resistance constituting means for causing disproportionate changes in the currents in the windings with temperature changes, and heat insulation surrounding the windings.

12. In an electric system, a supply circuit, a load circuit and an impedance device in series with and magnetically independent of said load, said impedance device comprising two windings connected in parallel and in effective inductive opposition, said windings formed of materials having substantially different temperature coefficients of resistance, said windings arranged to be heated by the current flow therein for altering the current distribution between the two said windings for changing the reactance of said device.

13. In an electric system comprising a supply circuit, a load circuit and an impedance device in series with and magnetically independent of said load, said impedance device comprising two windings connected in parallel and in effective inductive opposition, said windings formed of materials having substantially different temperature coefficients of resistance constituting means for producing a disproportionate change in the resistance of the windings with temperature changes for altering the ratio of the currents in the parallel paths and varying the resultant magnetism in the impedance device for changing its inductive reactance and thereby controlling the current passing to the load.

14. In an electric system, a supply circuit, a load circuit and an impedance device in series with and magnetically independent of said load, said impedance device comprising two windings connected in parallel and in effective inductive opposition, said windings formed of materials having substantially different temperature coefficients of resistance, constituting means for producing a disproportionate change in the resistance of the windings with temperature changes for altering the ratio of the currents in the parallel paths and varying the resultant magnetism in the impedance device for changing the power factor of the circuit.

15. In an electric system, a supply circuit, a load circuit and an impedance device in series with and magnetically independent of said load, said impedance device comprising two windings connected in parallel and in effective inductive opposition, said windings formed of materials having substantially different temperature coefficients of resistance, said windings operating at unity power factor at one selected temperature and less than unity power factor at higher and lower temperatures.

16. In an electric system, a supply circuit, a load circuit, and an impedance device in series with and magnetically independent of said load, said impedance device comprising two windings connected in parallel and in effective inductive opposition, said windings being formed of materials having substantially different temperature coefficients of resistance, said materials having the same resistance per unit length of conductor and operating at unity power factor at ambient temperature, and having different resistances and operating at less than unity power factor when heated.

17. In an electric system, a supply circuit, a load circuit, and an impedance device in series with and magnetically independent of said load, said impedance device comprising two windings connected in parallel and in effective inductive opposition, said windings being formed of materials having substantially different temperature coefficients of resistance, said material having different resistances per unit length of conductor and operating at less than unity power factor at ambient temperature, and having the same resistance and operating at unity power factor at elevated temperature.

18. In an electric system, a supply circuit, a load circuit and a transformer, the primary coil of said transformer connected to said supply circuit and the secondary coil of said transformer connected to said load circuit, at least one of said coils comprising two windings connected in parallel and in effective inductive opposition, at least one of said windings having in series with it a resistor adapted to change in resistance with temperature changes in the resistor, said windings and said resistor constituting means to alter the magnetic condition of the transformer with temperature changes in said resistor to control the flow of current from said supply circuit through said transformer to said load circuit.

19. In an electric system, a supply circuit, a load circuit, and a transformer, the primary coil of said transformer connected to said supply circuit, the secondary coil of said transformer connected to said load circuit, said primary coil comprising two windings connected in parallel and in effective inductive opposition, said primary windings formed of materials having substantially different temperature coefficients of resistance.

20. In an electric system, a supply circuit, a load circuit, and a transformer, the primary coil of said transformer connected to said supply circuit and the secondary coil of said transformer connected to said load circuit, one of said coils comprising two windings connected in parallel and in effective inductive opposition, said windings being formed of materials having substantially different temperature coefficients of resistance and having heat insulation thereabout.

21. An impedance device comprising two windings connected in parallel and in inductive opposition and wound on a core of magnetic material, one of said windings formed of material having substantially zero temperature coefficient of resistance, the other of said windings formed of material having a positive temperature coefficient of resistance, the different coefficient materials constituting means for causing a disproportionate change in current in the two windings under load to alter the inductive voltage drop across said impedance device, a supply source and a load in series with said device, said load and said device arranged in conductive relation only.

22. An impedance device comprising two windings connected in parallel and in inductive opposition and wound on a core of magnetic material, one of said windings formed of material having substantially zero temperature coefficient of resistance and the other of said windings formed of material having a negative temperature coefficient of resistance, the different coefficient materials constituting means for causing a disproportionate change in current in the two windings under load to alter the inductive voltage drop across said impedance device, a supply source and a load in series with said device, said load and said device arranged in conductive relation only.

23. An impedance device comprising two windings connected in parallel and in inductive opposition and wound on a core of magnetic material, one of said windings formed of material having a positive temperature coefficient of resistance, and the other of said windings formed of material having a negative temperature coefficient of resistance, the different coefficient materials constituting means for causing a disproportionate change in current in the two windings under load to alter the inductive voltage drop across said impedance device, a supply source and a load in series with said device, said load and said device arranged in conductive relation only.

24. A reactor comprising a pair of inductively coupled and opposed windings, each winding having a resistor in series with it, one winding and its series resistor being connected in parallel with the other winding and its series resistor, said resistors being formed of materials having substantially different temperature coefficients of resistance, a power supply circuit, a load circuit, means for connecting said load circuit to said power supply circuit through said windings and said resistors for controlling the current supplied to said load circuit.

25. A fuse substitute for use in a circuit to limit overload and short circuit currents consisting of an impedance device for connection in series with an alternating current supply source and a load, said load arranged in non-magnetic relation to said device, said impedance device comprising two windings connected in parallel and in effective inductive opposition, said windings formed of materials having substantially different temperature coefficients of resistance, wound on a core of magnetic material and proportioned to produce substantially zero inductive reactance at all current values up to full load current in the circuit, said windings subject to change in temperature with the current above full load for altering the current distribution to the said two windings for increasing said inductive reactance to limit the current to a predetermined maximum.

26. A maximum demand controller for use in a circuit to limit overload currents, consisting of an impedance device for connection in series with an alternating current supply source and a load, said load arranged in non-magnetic relation to said device, said impedance device comprising two windings connected in parallel and in effective inductive opposition, said windings formed of materials having substantially different temperature coefficients of resistance, wound on a core of magnetic material and proportioned to produce substantially zero inductive reactance at all current values up to full load current in the circuit, said windings subject to change in temperature with the current above full load for altering the current distribution to the said two windings for increasing said inductive reactance to limit the current to a predetermined maximum.

27. A constant current regulator for use in an alternating current circuit to hold the current substantially constant consisting of an impedance device for connection in series in said circuit and in non-magnetic relation to the load therein, said impedance device comprising two windings connected in parallel and in effective inductive opposition, said windings formed of materials having substantially different temperature coefficients of resistance and wound on a core of magnetic material, said windings subject to changes in temperature producing disproportionate changes in resistance thereof for altering the division of current in said windings, said alteration of current division producing variation in the impedance of said impedance device for controlling the current in said circuit, said variations in impedance being large in proportion to the current changes producing them.

28. A voltage regulator for a constant potential alternating current circuit consisting of an impedance device for connection in series with and in non-magnetic relation to the circuit to be regulated, said impedance device comprising two windings connected in parallel and in effective inductive opposition, said windings formed of materials having substantially different temperature coefficients of resistance and wound on a core of magnetic material, said windings proportioned to change in temperature and decrease in impedance with increased load.

29. In an electric system, a supply circuit, a load circuit, and a transformer, the primary coil of said transformer connected to said supply circuit and the secondary coil of said transformer connected to said load circuit, at least one of said coils comprising two windings connected in parallel and in effective inductive opposition, said windings being formed of materials having substantially different temperature coefficients of resistance, and means in series with one winding of said pair of windings to disconnect said winding and permit the entire current to the load to pass through the second winding of said pair of windings.

30. Means for automatically altering the current, voltage or power factor of an electrical system which includes a supply source and a load, said means comprising an impedance device in series with and magnetically independent of said load, said impedance device comprising two windings connected in parallel and in effective inductive opposition, said windings formed of materials having substantially different temperature coefficients of resistance.

31. A reactor as set forth in claim 14 in which said windings operate at substantially unity power factor when cool and less than unity power factor when heated.

32. A reactor as set forth in claim 14 in which said windings operate at unity power factor when heated and less than unity power factor when cooled.

33. A reactor as set forth in claim 14 in which said windings operate at unity power factor at one selected temperature and less than unity power factor at higher and lower temperatures.

34. A slow magnetic regulating device for connection in series with a source of electrical supply and a load, comprising a pair of inductively coupled and opposed windings connected in parallel and constituted by materials having different temperature coefficients of resistance, a magnetic structure having a movable portion associated therewith, the changes in resistance with temperature of said windings, the movement of said magnetic structure portion, and the changes in electromagnetic induction between said windings mutually cooperating to alter the magnetism and impedance of said device over a time period for controlling the current supplied to said load from said supply.

35. A slow magnetic regulating device for connection in series with a supply source and a load comprising a pair of inductively coupled and opposed windings connected in parallel and constituted by materials having different temperature coefficients of resistance, a core structure of magnetic material having a movable portion associated with said windings, said windings changing disproportionately in resistance with changes in temperature to alter the magnetism of said coil, to move said movable core, to alter the impedance and the transformer action of said windings and thereby control the current supplied to said load.

36. A device as in claim 35 in which changes in temperature of said windings cause initial changes in magnetism, and movement of said core, changes in impedance, and changes in the transformer action of said windings produce further magnetism changes over a time cyclic.

37. A slow magnetic regulating device for connection in series with a supply source and a load consisting of an electromagnet coil with a movable core, said electromagnet coil comprising a pair of inductively coupled and opposed windings connected in parallel and constituted by materials having different temperature coefficients of resistance, said windings changing disproportionately in resistance with changes in temperature to alter the magnetism of said core, said change in magnetism serving to move said core, to alter the impedance of said coil, alter the current in said series circuit and alter the transformer action between said windings.

38. A slow magnetic regulating device for connection to a supply source and in series with and magnetically independent of a load for controlling the voltage, current or power factor of said load, said device comprising a pair of inductively coupled and opposed windings connected in parallel and constituted by materials having different temperature coefficients of resistance, changes in resistance of said windings with temperature, and changes in the electromagnetic induction between said windings mutually cooperating to alter the magnetism and impedance of said device over a time cycle for controlling the current through the load.

39. An impedor connected to a supply source in series with and in non-magnetic relation to a motor, said impedor serving as the control means for said motor, comprising a core of magnetic material, a pair of inductively coupled and opposed windings supported on said core, said windings connected in parallel, one with respect to the other, and means for automatically varying the ratio of the currents in the windings with time of operation, said variation in the ratio of the currents producing changes in magnetism and altering the impedance of said impedor.

40. An impedor for connection to a supply source in series with and magnetically independent of a motor, said impedor serving as a motor control and comprising a core of magnetic material, a pair of inductively coupled and opposed windings supported on said core, said windings connected in parallel one with respect to the other, and including materials having different temperature coefficients of resistance, said impedor having an impedance voltage drop which automatically varies from an initial relatively high value to a final relatively low value at rated current in an infinite number of steps, said windings being subject to disproportionate changes in current as the temperature of the windings changes for altering the magnetism in the core for varying said impedance voltage drop.

41. A slow magentic regulating device for connection in series with a source of electrical supply and a load, comprising a pair of inductively coupled and opposed windings connected in parallel, each of said windings having a resistor in series with it within the parallel connection, said resistors constituted by materials having different temperature coefficients of resistance, a magnetic structure having a movable portion associated therewith, the changes in resistance with temperature of said resistors, the movement of said magnetic structure portion, and the changes in electromagnetic induction between said windings mutually cooperating to alter the magnetism and impedance of said device over a time period for controlling the current supplied to said load from said supply.

42. A slow magnetic regulating device for connection in series with a supply source and a load for controlling the voltage, current or power factor of said load, said device comprising a pair of inductively coupled and opposed windings connected in parallel, each of said windings having a resistor in series with it within the parallel connection, said resistors constituted by materials having different temperature coefficients of resistance, changes in resistance of said resistors with temperature, and changes in the electromagnetic induction between said windings mutually cooperating to alter the magnetism and impedance of said device over a time cycle for controlling the current through the load.

43. An alternating current slow electromagnetic regulating device comprising two inductively coupled and opposed windings connected in parallel and constituted by materials having different temperature coefficients of resistance, said windings arranged for substantially complete flux interlinkage, said windings proportioned to produce substantially zero magnetism and no sound at a selected temperature with current in the windings and to produce magnetism and sound at other temperatures with current in the windings.

ALBERT B. RYPINSKI.